March 6, 1934.   W. H. DE CAMP   1,949,561
ANTISCORCH APPLIANCE FOR COOKING UTENSILS
Filed April 6, 1933
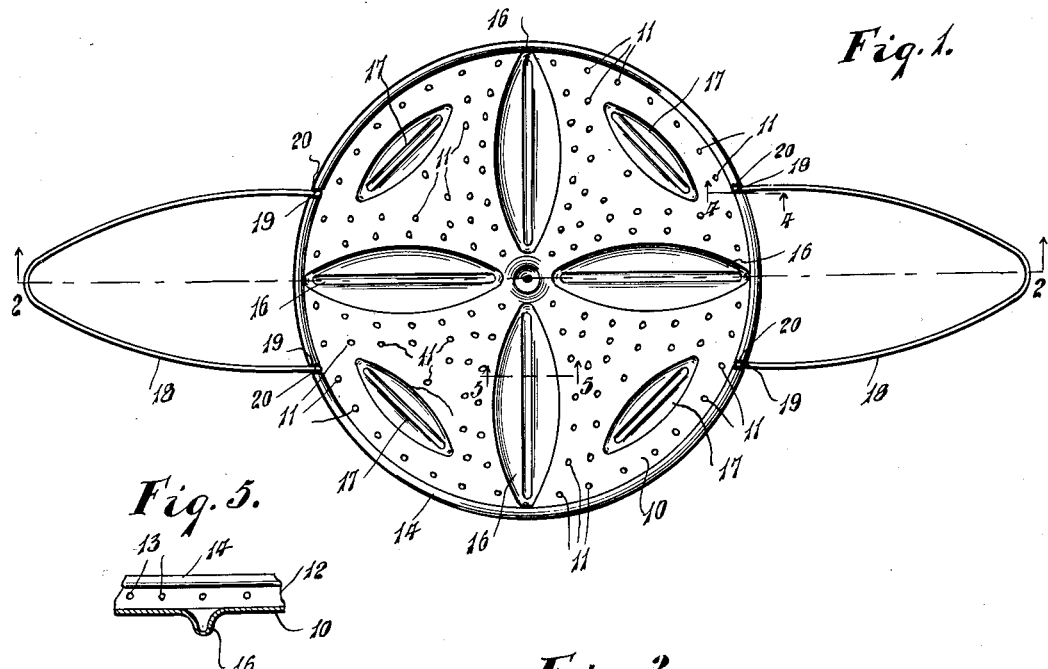
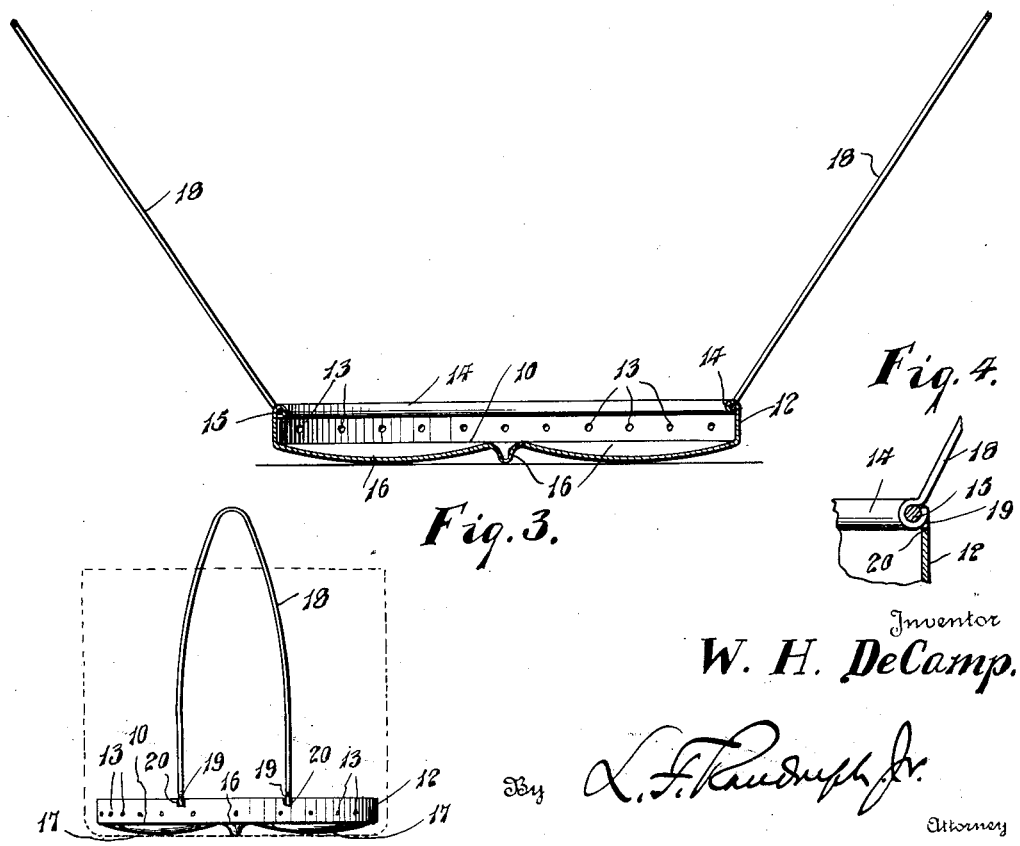
Inventor
W. H. DeCamp.

Patented Mar. 6, 1934

1,949,561

UNITED STATES PATENT OFFICE 1,949,561

ANTISCORCH APPLIANCE FOR COOKING UTENSILS

William H. De Camp, Van Wert, Ohio

Application April 6, 1933, Serial No. 664,797

1 Claim. (Cl. 53—1)

The invention relates to a device to be used in connection with cooking utensils, such as pots, saucepans and the like, and has for its object the provision of a device to prevent scorching or burning of foods while being cooked, and to provide a thoroughly practical device that is adapted to be used in placing the food in position in the utensil for cooking, and to remove the food therefrom, draining it of the water used for the cooking during the removal.

A further object of the invention is the provision of a device that may be used for cooking food in deep hot fat, such as fried oysters, and the like, doughnuts, etc., the device being so constructed that the food is retained within the receptacle and held from contact with the bottom to prevent overcooking or scorching.

The invention will be described in detail hereinafter and will be found illustrated in the accompanying drawing, in which Figure 1 is a top plan view of the improved device, Figure 2 is a sectional view on a plane indicated by the line 2—2 of Figure 1, Figure 3 is a side view in elevation, on a reduced scale, Figure 4 is a sectional detail on a plane indicated by the line 4—4 of Figure 1, and Figure 5 is a sectional detail on a plane indicated by the line 5—5 of Figure 1.

In the drawing similar reference characters are used to designate corresponding parts in all the views.

The improved anti-scorch plate or appliance is preferably made of a single blank of sheet metal that is formed preferably to provide a circular bottom 10 having a plurality of restricted openings 11 therein to permit circulation of the cooking water or hot fat therethrough, but sufficiently small to prevent peas, beans, and other small articles of food from passing therethrough. The circumferential edge of the bottom is provided with an upstanding wall 12 that is also perforated with minute openings 13, the upper free edge of the wall 12 being rolled internally as shown at 14 around a filler wire 15.

In order to elevate the bottom 10 above the containing cooking utensil, and to prevent the food contained within the receptacle from contact with said bottom of the cooking utensil, the bottom 10 is provided with a plurality of elevating members 16 and 17, said elevating members being formed by pressing the sheet metal bottom, and are V-shaped in cross section as shown in Figures 3 and 5 of the drawing. The elevating members 16 are as shown radial of the bottom, while the elevating members 17 are arranged on lines substantially concentric with the center of said bottom.

In order to manipulate the anti-scorch appliance there is provided one or more bails 18 that are preferably made of wire and have their ends formed with eyes or loops 19 that are pivotally mounted on the wire filler 15, the rolled portion 14 being cut out as shown at 20 to accommodate the ends of the bail.

In the drawing the device is shown with two bails arranged diametrically opposite to one another, but obviously a single bail may be substituted if desired.

Also the device is shown circular in contour, but obviously the device may be of any shape necessary to fit vessels to which it may be adapted, and I do not limit myself to the construction as shown, except where limited in the claim hereinafter set out.

By having the rolled portion 14 turned inwardly of the side wall 12 it will be apparent that the appliance may be used with a pot or other receptacle that is of the same inner diameter as the external diameter of the device, the wire bails by engaging the filler wire through openings in the rolled portion 14, as shown and described, also permitting such use.

It will be apparent that the appliance may be made of varying diameters and as hereinbefore stated of varying shapes and also of sizes to accommodate its use to different kinds of cooking utensils.

What is claimed is:

An anti-scorch appliance for culinary vessels, comprising a shallow receptacle made of sheet metal having a perforated bottom and an upstanding perforated side wall, the upper edges of said side walls being rolled inwardly of the receptacle over a wire filler, a bail pivotally secured to said wire filler, the rolled portion provided with cut out portions to accommodate the pivoted ends of the bail, and the bottom of the receptacle having depressed portions substantially V-shaped in cross section to raise said bottom above the bottom of a cooking utensil.

WILLIAM H. DE CAMP.